(No. Model.)
C. R. POULSEN.
PROCESS OF AND APPARATUS FOR MAKING OZONE.
No. 513,825. Patented Jan. 30, 1894.
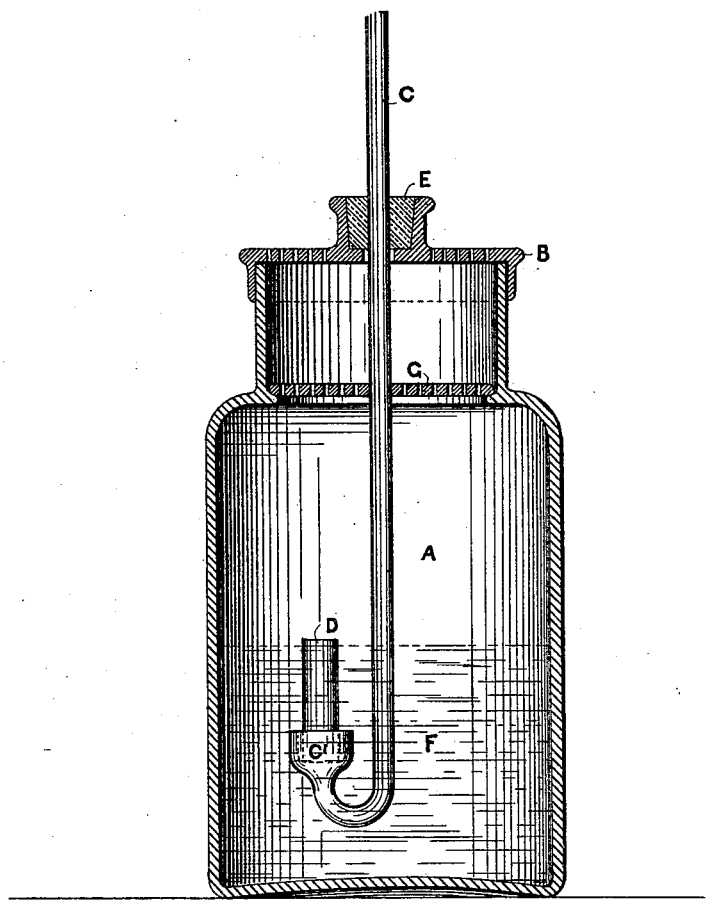

UNITED STATES PATENT OFFICE.

CHRISTEN RAVNSBOK POULSEN, OF HORSENS, DENMARK.

PROCESS OF AND APPARATUS FOR MAKING OZONE.

SPECIFICATION forming part of Letters Patent No. 513,825, dated January 30, 1894.

Application filed December 19, 1892. Serial No. 455,656. (No model.) Patented in Norway August 16, 1892, No. 2,845; in England August 17, 1892, No. 14,862; in France August 20, 1892, No. 223,832; in Belgium September 30, 1892, No. 101,563; in Switzerland October 6, 1892, No. 5,700; in Canada April 10, 1893, No. 42,539; in Austria-Hungary May 4, 1893, No. 61,947 and No. 90,661, and in Italy September 30, 1893, XVII, 34,446.

*To all whom it may concern:*

Be it known that I, CHRISTEN RAVNSBOK POULSEN, a subject of the King of Denmark, residing at Horsens, in the Kingdom of Denmark, have invented a new and useful Process of and Apparatus for the Production of Ozone, (for which patents have been obtained in the following countries, viz: Norway, No. 2,845, dated August 16, 1892; England, No. 14,862, dated August 17, 1892; France, No. 223,832, dated August 20, 1892; Belgium, No. 101,563, dated September 30, 1892; Switzerland, No. 5,700, dated October 6, 1892; Austria-Hungary, No. 61,947 and No. 90,661, dated May 4, 1893; Canada, No. 42,539, dated April 10, 1893, and Italy, No. 34,446, Reg. Gen. XVII, dated September 30, 1893,) of which the following is a specification.

My invention refers to a process and apparatus for the production of ozone by means of phosphorus and a suitable liquid whereby phosphorous acid is developed and transformed into phosphoric acid, while pure ozone is given off which finds its way out of the apparatus. This ozone is principally intended for being inhaled in cases of tuberculosis and other diseases of the chest, but is also useful for purifying the air in halls, rooms, shops, offices and other places.

The process consists in the developing of ozone by the action of oxygen or the oxygen in air upon moist surfaces of phosphorus in the presence of permanganic acid or similar oxidizing substances.

The apparatus consists of a bottle or reservoir into which is passed a rod that holds a piece of phosphorus in contact with a suitable liquid in the lower part of the bottle and with the air in the space above it and for this purpose can be moved up and down as required. The bottle is provided with a finely perforated diaphragm. The phosphorous acid and the ozone developed arising against the latter, the acid will be deflected downward and transformed into phosphoric acid while the ozone will escape out of the bottle through the perforations.

The drawing shows in vertical section an apparatus according to this invention and suitable for carrying out the process described.

A is a bottle or reservoir made of glass or other suitable material having a perforated or openwork glass or procelain top or cap B through which is passed a rod C formed of the same material. The lower end of this rod is bent round and socketed as shown at C' or otherwise formed to hold a stick D of phosphorus in contact with and by preference quite surrounded as shown by the liquid F in the bottle. The neck of the top or cap B is provided with a cork E having a hole through which the rod C is then passed and with such a fit as to allow of the same being moved up and down with slight friction and to be normally held at any desired altitude in the bottle A. The liquid F suitably consists of distilled water with an addition of about ten per cent. chemically pure sulfuric acid whereto is added some permanganate of potash but no more than that the liquid is transparent when tested by placing some of the liquid in a tumbler and holding it to the light and which would represent about one gram of the permanganate per one and one-half liters of the liquid. A larger quantity of the permanganate may be used but the ozone then given off is liable to be impure, wherefore I prefer to use the weaker solution and to add at intervals, say once a week, the required small quantity of the permanganate. Some distance below the cap or top B and resting on a shoulder or otherwise held is a finely perforated porcelain or glass diaphragm or plate G having a hole for the rod C to pass through. The openings in this plate and in the top B allow of the exit of the pure ozone into the room or other place while the phosphoric acid is retained in the reservoir. The phosphorous acid developed by the oxidation of the phosphorus will in rising be stopped by the plate G and be deflected down upon the liquid and be absorbed by it and transformed into phosphoric acid while the ozone simultaneously developed by the oxidation process will pass up through the holes in the plate G and in the top B. The plate G thus effects a separation of phosphorous acid while the ozone passing off is perfectly pure.

The reactions taking place are probably the following: When the permanganate is put into the acidulated water the first effect is the development of potassium sulfate and liberation of the unstable permanganic acid; this latter strongly oxidizing agent then decomposes, the rapidity being increased by the presence of the phosphorus. This acid seems in some way to cause the development of a much larger quantity of ozone on the surface of the phosphorus than is produced by phosphorus moistened by water or acidulated water without permanganate of potash. It also oxidizes the phosphorous acid produced and converts it into the much less volatile phosphoric acid.

Having thus described my invention, what I claim as new therein, and desire to secure by Letters Patent, is—

1. The process of producing ozone, which consists in causing oxygen to act upon a moist surface of phosphorus in the presence of an oxidizing agent as permanganic acid.

2. The process of producing ozone, which consists in causing oxygen to act upon phosphorus moistened with a solution of sulfuric acid and permanganate of potash.

3. The process of producing ozone, which consists in causing air to act upon phosphorus moistened with a suitably diluted acid solution of permanganic acid, as set forth.

4. An apparatus for producing ozone, comprising a vessel, a perforated partition seated in the neck of the vessel, a perforated cover for said neck and a holder for phosphorus consisting of a glass rod having its lower end recurved and socketed, said rod extending through and adjustable vertically in said partition and cover, for the purpose set forth.

CHRISTEN RAVNSBOK POULSEN.

Witnesses:
V. PULMANN,
*Inspector of Customs.*
V. POLBECH,
*Customs Cashier.*